(12) United States Patent
van Schaik et al.

(10) Patent No.: US 11,449,335 B2
(45) Date of Patent: Sep. 20, 2022

(54) WEIGHTING STATIC ANALYSIS ALERTS

(71) Applicant: MICROSOFT TECHNOLOGY LICENSING, LLC, Redmond, WA (US)

(72) Inventors: Sebastiaan Johannes van Schaik, Oxford (GB); Man Yue Mo, Oxford (GB); Jean Helie, Oxford (GB)

(*) Notice: Subject to any disclaimer, the term of this patent is extended or adjusted under 35 U.S.C. 154(b) by 25 days.

(21) Appl. No.: 16/578,884

(22) Filed: Sep. 23, 2019

(65) Prior Publication Data

US 2020/0150952 A1     May 14, 2020

Related U.S. Application Data

(63) Continuation of application No. 15/960,194, filed on Apr. 23, 2018, now Pat. No. 10,423,409.

(Continued)

(51) Int. Cl.
*H04L 41/0631* (2022.01)
*G06F 8/75* (2018.01)
(Continued)

(52) U.S. Cl.
CPC .............. *G06F 8/75* (2013.01); *G06F 11/327* (2013.01); *G06F 11/3604* (2013.01);
(Continued)

(58) Field of Classification Search
CPC ... H04L 41/06; H04L 41/069; H04L 41/0604; H04L 41/0631; G05B 2219/14097; G06F 8/75; G06F 11/327; G06F 11/3604; G06F 17/18; G06F 8/71; G06F 11/3664; G06F 30/398; G06F 2115/06; G06F 3/012; G06F 3/013; G06F 3/04815; G06F 30/20; (Continued)

(56) References Cited

U.S. PATENT DOCUMENTS 9,503,873 B1* 11/2016 Yadav ..................... H04W 4/08
2004/0030796 A1* 2/2004 Cooper ................. H04L 41/069
709/231

(Continued)

OTHER PUBLICATIONS

Flynn, Prioritizing Alerts from Static Analysis to Find and Fix Code Flaws: Jun. 6, 2016 (Year: 2016).*

(Continued)

*Primary Examiner* — Chat C Do
*Assistant Examiner* — Noor Alkhateeb
(74) *Attorney, Agent, or Firm* — Workman Nydegger

(57) ABSTRACT

Methods, systems, and apparatus, including computer programs encoded on computer storage media, for computing weights for source code alerts. One of the methods includes generating a respective sample of alerts for each feature of a plurality of features. One or more feature values are computed for alerts having a same respective attribute value for each feature of a plurality of features. An importance distribution that maps each feature value to a respective measure of importance for an alert having the feature value is used to compute a respective feature score for the feature using one or more feature values computed the alert. A respective weight is computed for each alert by combining the plurality of feature scores computed for the alert.

20 Claims, 4 Drawing Sheets

Related U.S. Application Data

(60) Provisional application No. 62/488,273, filed on Apr. 21, 2017.

(51) Int. Cl.

| | | |
|---|---|---|
| *G06F 17/18* | (2006.01) | |
| *G06F 11/32* | (2006.01) | |
| *G06F 11/36* | (2006.01) | |
| *H04L 41/06* | (2022.01) | |
| *H04L 41/069* | (2022.01) | |
| *H04L 41/0604* | (2022.01) | |

(52) U.S. Cl.
CPC .... *G06F 17/18* (2013.01); *G05B 2219/14097* (2013.01); *H04L 41/06* (2013.01); *H04L 41/0604* (2013.01); *H04L 41/069* (2013.01)

(58) Field of Classification Search
CPC .. G06F 30/367; G06F 30/392; G06F 16/2465; G06F 16/284; G06F 16/9535; G06F 21/6245; G06F 2216/03; G06N 20/00; G16Z 99/00; G06Q 30/02; G06Q 10/06; G06Q 10/0635; G06Q 40/00; G06Q 40/02; G06Q 40/08; G06Q 50/02
See application file for complete search history.

(56) References Cited

U.S. PATENT DOCUMENTS

| | | | | |
|---|---|---|---|---|
| 2006/0165379 | A1* | 7/2006 | Agnihotri | H04N 21/84 386/231 |
| 2010/0333069 | A1* | 12/2010 | Chandra | G06F 8/75 717/126 |
| 2011/0022551 | A1* | 1/2011 | Dixon | G06F 11/3616 706/12 |
| 2014/0096113 | A1* | 4/2014 | Kuehlmann | G06F 11/3676 717/126 |
| 2017/0147186 | A1* | 5/2017 | Velusamy | G06F 3/0482 |

OTHER PUBLICATIONS

Heckman et al., On Establishing a Benchmark for Evaluating Static Analysis Alert Prioritization and Classification Techniques: Oct. 9, 2008 (Year: 2008).*

* cited by examiner

WEIGHTING STATIC ANALYSIS ALERTS

CROSS-REFERENCE TO RELATED APPLICATION

This application is a continuation of U.S. application Ser. No. 15/960,194, filed Apr. 23, 2018, which claims the benefit of U.S. Provisional Application No. 62/488,273, filed Apr. 21, 2017, the contents of which are herein incorporated by reference.

BACKGROUND

This specification relates to static analysis of computer software source code.

Static analysis refers to techniques for analyzing computer software source code without executing the source code as a computer software program.

Static analysis techniques include techniques for identifying potential problems in or opportunities for improving software projects. In this specification, the term "software project," or for brevity, a "project," is a collection of source code files organized in a particular way, e.g., in a hierarchical directory structure, with each source code file in the project having a respective path. Each project has one or more respective owners and one or more source code developers who contribute source code to the project. Typically, the source code files in a project provide one or more related functionalities.

A static analysis system can analyze projects using a collection of static analysis rules, which for brevity can simply be referred to as rules. Each rule is defined to identify characteristic segments of source code. A characteristic segment of source code is a segment of source code having a particular attribute of interest. Each characteristic segment of source code typically identifies a potential problem or an opportunity for improving source code in a particular programming language. Each characteristic segment of source code can thus be referred to as a coding defect. Data elements representing such defects will be referred to as violations.

Typically, the characteristic segments of source code, while not ideal in some respects, are nevertheless valid programming language statements. That is, the static analysis rules can identify characteristic segments of source that do not generate errors or warnings when compiled, linked, interpreted, or executed.

Each static analysis rule specifies one or more attributes for one or more source code elements, one or more relationships between source code elements, or some combination of these. For example, a rule can be defined to identify when a function call has an unexpected number of arguments, e.g., more arguments than a number of arguments that are specified by the definition of the function. A function call having an unexpected number of arguments can be a bug, in which case the rule can indicate that the function call is a bug that should be fixed.

Static analysis rules can identify more than bugs. For example, static analysis rules can identify characteristic segments of source code that present long-term risks to the ability to work with the source code. In these cases, even though the code may work perfectly fine, the static analysis rules can nevertheless flag these segments of source code as opportunities to improve the quality of the project. For example, static analysis rules can identify potential problems with correctness, e.g., in code for concurrent processes; maintainability, e.g., duplicate code segments; readability, e.g., code having excessive complexity; and framework usage, e.g., code that incorrectly uses code libraries, to name just a few examples. Such static analysis rules can be defined using one or more formalized coding standards. A static analysis system can use any appropriate set of coding standards, e.g., the NASA Jet Propulsion Laboratory Institutional Coding Standard for the Java Programming Language, available at http://lars lab.jp1.nasa.gov/JPL_Coding_Standard_Java.pdf.

A static analysis system can analyze the source code of a project to find instances in which source code elements satisfy rules in the collection of static analysis rules. Some static analysis systems define rules using database query languages, e.g., Datalog or SQL. For example, a static analysis system can parse the source code in a project to populate a database that stores various properties of source code elements in the project. A static analysis system can then use a query language to query the database to identify instances of source code elements that satisfy one or more static analysis rules.

When a rule is satisfied by the properties of one or more source code elements, a static analysis system can generate an alert. An alert is data that specifies information about the rule that has been satisfied, e.g., which source code elements are involved, which rule has been satisfied, the location in the project of the implicated source code elements, and an alert description that includes a user-readable message about the alert. A static analysis system can then present alerts in a user interface presentation for consumption by one or more developers of the project. For brevity, an alert can be referred to as occurring in a particular project when the alert identifies source code that occurs in a particular project.

The alerts can guide the developers on how to improve the quality of the source code in the project. For example, a team of developers can manually address each alert in turn, e.g., by fixing the problem identified by the alert so that the corresponding static analysis rule is no longer satisfied by the changed source code.

However, manually inspecting and addressing alerts can be a very time consuming and resource-intensive activity. Therefore, addressing each and every alert identified for a project is often an unrealistic goal. The number of alerts generated for real-world projects of any considerable size can be overwhelming. Therefore, there is often a mismatch between the number of alerts generated and the developer resources that are available to address alerts in the project. Developers have other responsibilities other than addressing alerts, e.g., writing new features and running tests. Thus, most projects have developer resources to address only a small fraction of the total alerts that are identified.

SUMMARY

This specification describes how a static analysis system can compute weights for static analysis alerts in a principled way from multiple different alert features. The weights inform the system how the alerts should be prioritized and also inform developers about how to allocate resources to addressing alerts.

Particular embodiments of the subject matter described in this specification can be implemented so as to realize one or more of the following advantages. Alerts can be weighted according to rule-level and alert-level features. This can allow a system to leverage the experiences and actions of many developers across many projects in order to inform a user about how important he or she should consider an alert to be. The system can combine rule-level features, alert-level features, user-level features, and combinations of features in a principled way that is easy to understand. The framework provides for readily incorporating expert knowledge with empirically computed features.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
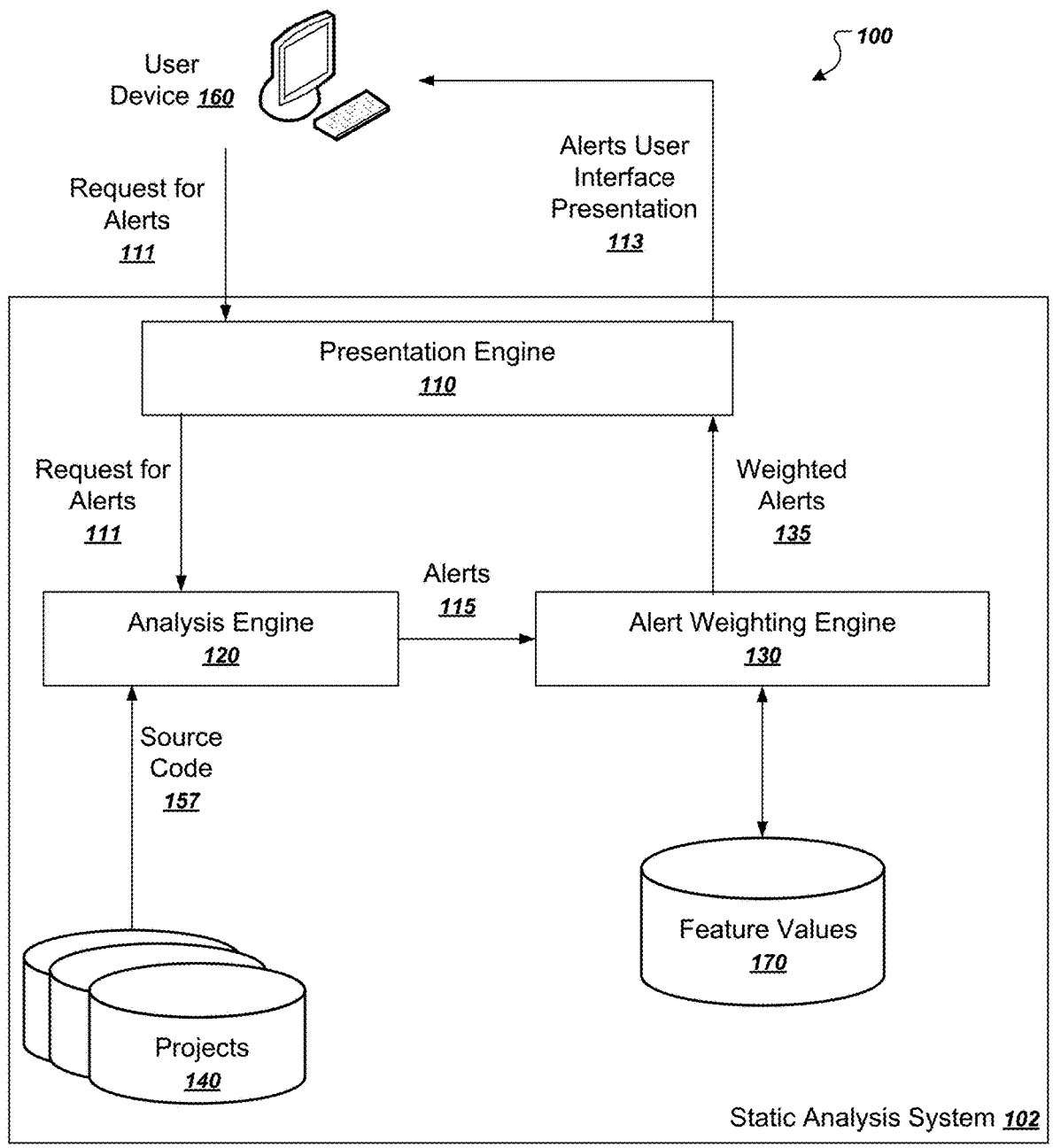
FIG. 1 is a diagram of an example system.

FIG. 1 is a diagram of an example system 100. The system 100 includes a user device 160 in communication with a static analysis system 102. The static analysis system 102 is an example system that can be implemented as a distributed, cloud-based system for performing distributed static analysis for multiple heterogeneous projects. Alternatively, the components of the static analysis system 102 can be installed at a single site or on a single machine.

The static analysis system 102 includes multiple functional components, including a presentation engine 110, an analysis engine 120, and an alert weighting engine 130. These functional components of the static analysis system 102 can be implemented as computer programs installed on one or more computers in one or more locations that are coupled to each other through a network. In a cloud-based static analysis system, these components can be implemented by individual computing nodes of a distributed computing system.

The static analysis system 102 also includes a number of data collections, including a collection of projects 140 and a collection of feature values 170. Each of these collections can be implemented using any appropriate data storage subsystem, e.g., in a version control system or using a database. Although illustrated as being part of the static analysis system 102, these collections can also be stored by different entities. For example, one or more of the projects 140 can be stored by respective version control systems.

Users can access the static analysis system 102 to obtain alerts about source code in the projects 140. Many different entities, e.g., open source teams, commercial developers, and individual users can use the static analysis system 102 to analyze projects. For example, a developer can request that the static analysis system 102 analyze a particular project in the collection of projects 140.

To obtain alerts for a project, a user of user device 160 can provide a request for alerts 111 to the static analysis system. The request for alerts 111 can specify an identifier of a project in the collection of projects 140 to be analyzed. The user device 160 can communicate with the static analysis system 102 over any appropriate data communications network, e.g., one that includes an intranet, the Internet, or some combination of these.

A presentation engine 110 can receive the request for alerts 111 and forward the request 111 to an analysis engine 120. The analysis engine 120 identifies the project specified by the request 111.

The analysis engine 120 can then use a collection of static analysis rules to generate alerts 115 for the specified project. The analysis engine 120 can read the source code 157 of the particular project and use static analysis rules associated with the source code 157 to generate alerts 115. The analysis engine 120 will generally select a subset of the static analysis rules that are appropriate for the specified project. For example, the analysis engine 120 can use only rules that are intended for one or more programming languages in which the project is written.

The analysis engine 120 can provide the generated alerts 115 to an alert weighting engine 130. The alert weighting engine 130 can compute feature values of a variety of different features from a variety of data sources to assign one or more weights to each of the alerts 115. In general, the alert-weighting engine 130 can compute feature values for alerts by aggregating over any appropriate logical unit of alerts. Typically, the alert-weighting engine 130 defines each logical unit of alerts to be alerts having one or more same attribute values. In this context, the rule type for a particular alert can be considered to be an attribute of the alert. Therefore, in some cases the alert-weighting engine 130 can compute a feature value from all alerts that are generated for a particular rule, e.g., in order to compute a measure of prevalence of alerts generated by that rule. As another example, the file that a particular alert occurs in can also be considered to be an attribute of the alert. Therefore, in other cases, the alert-weighting engine 130 can compute a feature value from all alerts that occur in a particular file, e.g., in order to compute a measure of centrality of the alert according to how centrally the file appears in a call graph of the project.

The alert-weighting engine 130 can select a sample of alerts over which to compute the feature values from multiple different software projects. The alert-weighting engine 130 can select the same sample or a different sample when computing feature values for each feature.

After computing the feature values from the samples, the alert-weighting engine 130 can then assign the computed feature values to each alert in the logical unit or all alerts that have the one or more same attribute values.

The alert-weighting engine 130 can store the computed feature values in the collection of feature values 170. The alert-weighting engine 130 can compute the feature values either before or after the request for alerts 111 is received. Typically, at least some feature values are computed offline, e.g., before the request for alerts 111 is received.

The alert weighting engine 130 uses the collection of feature values 170 to compute weights for each of the alerts 115. In some implementations, the weight is a single score computed by the alert weighting engine 130. Alternatively or in addition, the weight can be a composite data element that records different feature scores for each of the different features. The system can then compute a final weight for the rule using the values for each of the different feature scores.

The alert weighting engine 130 can then provide the weighted alerts 135 back to the presentation engine 110, which generates a user interface presentation 113, e.g., a web page, that lists one or more of the alerts 115. The presentation engine 110 can then provide the user interface presentation 113 back to the user device 160. In some implementations, the analysis engine 120 or the presentation engine 110 or both can filter the alerts, 115, rank the alerts 115, or both, so that only a subset of the alerts 115 generated by the analysis engine 120 end up appearing in the user interface presentation 113 that is provided back to the user device 160.

Figure 2:
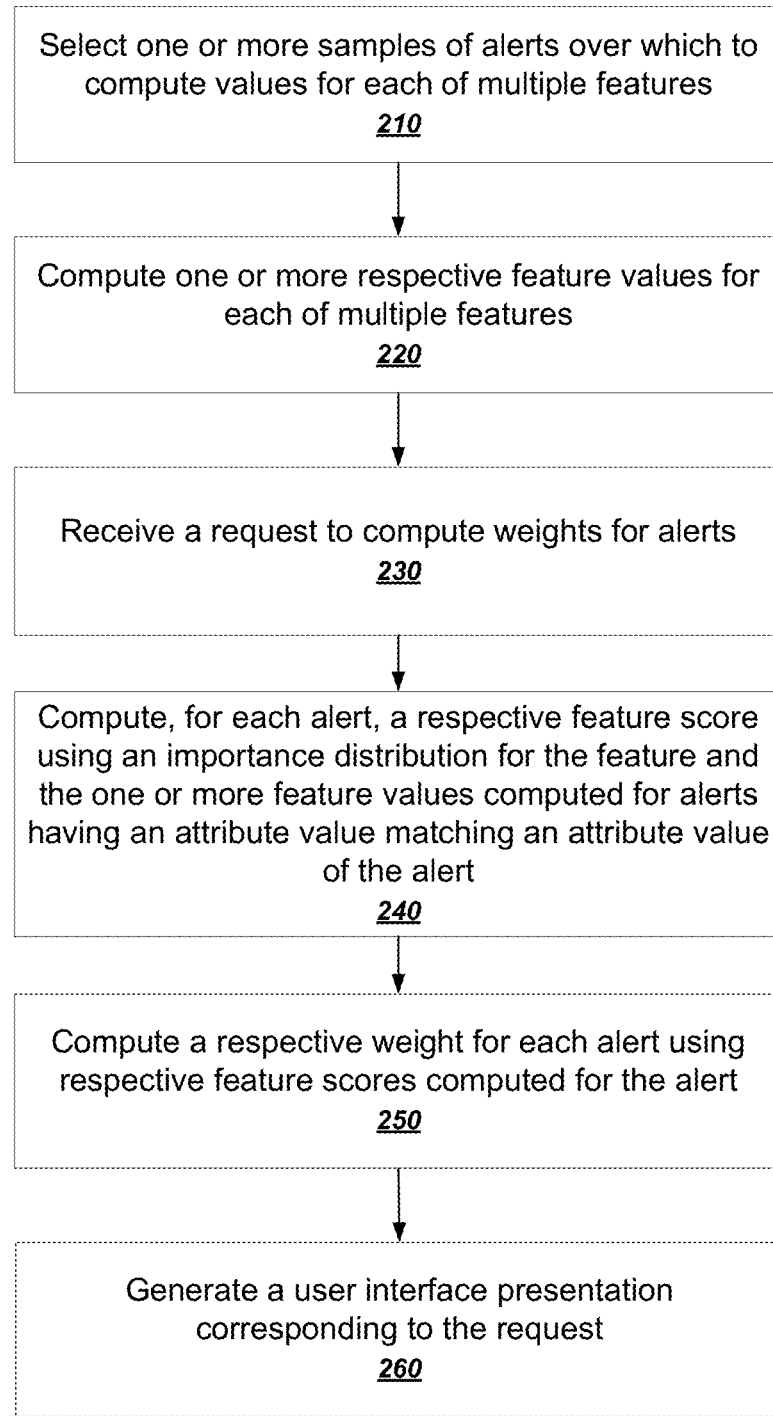
FIG. 2 is a flow chart of an example process for computing weights for alerts.

FIG. 2 is a flow chart of an example process for computing weights for alerts. In general, the system computes respective weights for alerts using feature scores computed from multiple features. The process can be implemented by an appropriately programmed system of one or more computers, e.g., the alert weighting engine 130 of FIG. 1.

The system selects one or more samples of alerts over which to compute values for each of a plurality of features (210). As described above, the system can select one or more alerts having one or more same attribute values when computing the feature values for the features. In some implementations, the system selects, as a sample of alerts, at least a threshold number of alerts from each of multiple different software projects for each feature in order to increase the scope and diversity of data that is analyzed. The alerts that the system selects can depend on the feature being computed.

The system computes one or more respective feature values for each of multiple features (220). For each sample of alerts for a particular feature, the system computes respective feature values for each feature. In some implementations, the system can represent the computed feature values as a feature value distribution $P(x|A)$ that represents a likelihood of an alert A from each sample of alerts having a particular feature value x. To compute a feature value distribution, the system can fit a particular distribution type to the empirically computed feature values. The system can choose any appropriate distribution type as well as any appropriate technique for fitting a distribution to the data.

Some features have just a single feature value within the sample alerts, while other features have multiple feature values. For single feature values, the feature value distribution can simply assign a maximum likelihood for the single feature value $x_R$ and a minimum likelihood for all other feature values. For example, the system can define $P(x|A)$ as follows:

$$P(x|A)=1 \text{ if } x=x_R, \text{ and } 0 \text{ otherwise.}$$

In these cases, the feature value distribution would correspond to a distribution having a single point. Alternatively or in addition, the system can generate the feature value distribution as a sharply peaked distribution curve centered at the single feature value.

A variety of features and how to compute their feature values will now be described.

One example feature is prevalence. Prevalence quantifies how likely it is for an alert having one or more specified attributes to occur. In general, alerts that are very prevalent are unlikely to be important, while alerts that are rare are more likely to be important.

Prevalence of alerts can change over time, however. Therefore, the system can compute multiple feature values of prevalence for each of multiple time periods. To do so, the system can partition the commit history of multiple projects into multiple time periods. The system can choose any appropriate time period for each partition, e.g., one day, one week, one month, or one year, to name just a few examples. In addition, the time periods need not have equal size.

For each time period, the system can compute a proportion of projects that have or have introduced more than a threshold number of alerts having a particular attribute during the time period. In other words, the system determines how many projects of multiple different projects have or have introduced at least a particular number of alerts. The system can represent each proportion in any appropriate way, e.g., as a ratio, a percentage, or a raw count of projects.

In this sense, the time window is a second attribute used to compute values for the prevalence feature. In fact, for many of the features described below, the system can use a time window in which an alert occurs as an additional attribute for computing the feature values. When doing so, the system can compute a different feature value distribution for each different value of a first attribute, and populate each respective feature value distribution using alerts occurring within each respective time window acting as the second attribute.

Another example feature is actionability. Actionability quantifies how likely it is for developers to address an alert having one or more specified attributes. In other words, the actionability for an alert indicates how often coding defects identified by alerts having the one or more specified attributes were fixed in one or more projects. Alerts that tend to get fixed are more likely to be important than alerts that tend not to get fixed.

To compute a measure of actionability, the system can compare adjacent snapshots in a revision graph of each project to determine when particular violations were fixed between one snapshot and the next. Example processes for identifying introduced and fixed violations are described in commonly owned U.S. Patent Application No. 61/983,932, for "Source Code Violation Matching and Attribution," to Henriksen et al., which is incorporated here by reference.

Commonality of introductions and commonality of fixes are two other example features. The commonality of introductions quantifies the proportion of developers who introduced alerts having one or more specified attributes. The rationale is that alerts that tend to be introduced by many different developers are less likely to be important than alerts that are introduced by only a handful of developers. Similarly, the commonality of fixes quantifies the proportion of developers of projects who fixed alerts having one or more specified attributes. The rationale is that alerts that tend to be fixed by many developers are more likely to be important than alerts that are fixed by only a handful of developers.

File deletion fixes is another example feature. File deletions fixes quantifies the proportion of alert fixes, for alerts having one or more specified attributes, that are due to files being deleted as opposed to files being modified. Deleting files from a project does remove alerts in those files, but doing this requires far less effort than modifying the file to fix the alert. The rationale is that the amount of work required to fix an alert closely tracks the alert's importance. Therefore, alerts that tend to be fixed by file deletions are less likely to be important than alerts that tend to be fixed by file modifications.

Currentness is another example feature. Currentness is designed to penalize instances of alerts that have declined in prevalence over time. The rationale is that the introduction of an alert whose prevalence has declined is indicative of a bad practice that most others have abandoned, presumably for good reasons. Therefore, an alert whose prevalence has declined over time is more likely to be important than an alert whose prevalence has not declined.

In order to compute a measure of currentness for alerts having one or more specified attributes, the system can compute a date before which a threshold percentage of the alerts were introduced, e.g., 50%, 75%, or 90%. For example, the system may determine that a particular threshold, e.g., 90%, of alerts having a first attribute were introduced before March 2016, and determine that a same threshold of alerts having a second attribute were introduced before February 2017. In this scenario, alerts having the first attribute are less current than alerts having the second attribute. Therefore, alerts having the first attribute that still exist in the code base would tend to be more important than alerts having the second attribute.

The currentness values may need to be adjusted if there are significant inherent currentness differences for alerts having different attributes. For example, if the attribute is rule types, significant inherent differences may exist for alerts generated by a particular rule that was introduced much later in time than other rules. In such cases, the system can compute the currentness as a percentile age (instead of a date) with respect to a date that the rule was first used for analysis.

Another example feature is expert ratings. Experts of the system can assign a hand-tuned measure of importance to each alert having one or more specified attributes. In some cases, the measure of importance is based on the rule that generated the alert. For example, the system can associate different tiers of severity with each static analysis rule, e.g., recommendations, warnings, and errors, with errors being the most serious, recommendations being the least serious, and warnings being somewhere in between. The system can then define respective measures of importance for alerts generated by a particular rule based on the tier of severity for the rule.

Another example feature is reachability. Reachability quantifies how reachable a coding defect for an alert is according to the call graph of a project. The rationale is that alerts that are more reachable in the call graph should be considered to be important because they are more likely to cause more serious issues in how the code operates than alerts that are less reachable.

Another example feature is file hotness. File hotness quantifies how active a particular file is in which alert occurs. In this case, the alert attribute is a file in which the alert occurs, and the feature value is a measure of how active the file is in the commit history of a project. The rationale is that alerts that are in more active files are more likely to be important than alerts that are in less active files. The system can compute a measure of file hotness for alerts occurring in a file by computing a proportion of recent commits that touched the file, a proportion of contributors that modified the file, a proportion of coding contributions accounted for by the file, or some combination of these.

In some implementations, the system uses only recent project activity to compute the measures of file hotness. The system can define recent project activity to include the last N commits, commits within a particular recent time period, or a hop-based distance that captures any commits that are at most M revisions away in a revision graph.

Another example feature is the age of an alert. The rationale is that alerts become harder to fix as time goes by. Therefore, newer alerts should be considered to be more important than older alerts. In order to compute an age of an alert, the system can use transitive violation matching techniques. Example processes for computing transitively matched violations and computing the age of a violation are described in commonly owned U.S. Patent Application No. 62/089,133, for "Transitive Source Code Violation Matching and Attribution," to Henriksen et al., which is incorporated herein by reference.

Another example feature is user activity data. User activity data can indicate how many users reviewed an alert in a user interface presentation generated by the static analysis system and also for long. For example, each alert can have a corresponding page on an interactive website generated by the static analysis system. The system can then determine how many users accessed each alert page and for how long to compute a measure of user activity data for the alert.

Each of the features described above can have one or more default alert attributes that are used to compute feature values for the feature in the typical case. For example, for prevalence, the system can use rule type and time window as the default alert attributes, but will generally not use file location. For reachability on the other hand, the system can use file location as the default alert attribute, but will generally not use rule types. Some features, like actionability, can have multiple single-attribute defaults. For example, an alert can have high actionability because it is generated for a serious rule type (a first single-attribute default) or because it occurs in a very important file (a second single-attribute default).

The system receives a request to compute respective weights for one or more alerts (230). As described above with reference to FIG. 1, the request can originate from a user device in communication with the system over a network. The request can specify any appropriate combination of alert attributes for which feature value distributions have been computed.

The system may, but need not, compute weights for all alerts in a single pass. This means that after computing the feature value distributions for the samples of alerts, the system proceeds to compute respective weights for the alerts in the samples. The system can, however, compute weights for other alerts that do not belong to the alert samples used to compute the feature value distributions.

The system computes, for each alert, a respective feature score for each feature using an importance distribution for the feature and the one or more feature values computed for alerts having an attribute value matching an attribute value of the alert (240). The importance distribution is a mapping between one or more feature values and a measure of importance for the alert. Each feature score for a feature thus represents a likelihood that an alert having particular attributes is important according to that feature.

The system can compute a feature score for an alert by using a relevant feature value distribution given the alert's attributes and the importance distribution for the feature. For example, the system can compute the feature score P(Importance A) for an alert according to equation (1):

$$P(\text{Importance}|A) = \int P(I|x) * P(x|A) dx, \quad (1)$$

which is an integration over the product of P(I|x), which is the mapping between feature values and the likelihood of importance, and P(x|A), which is feature value distribution for the alert given its attributes.

Figure 3A:
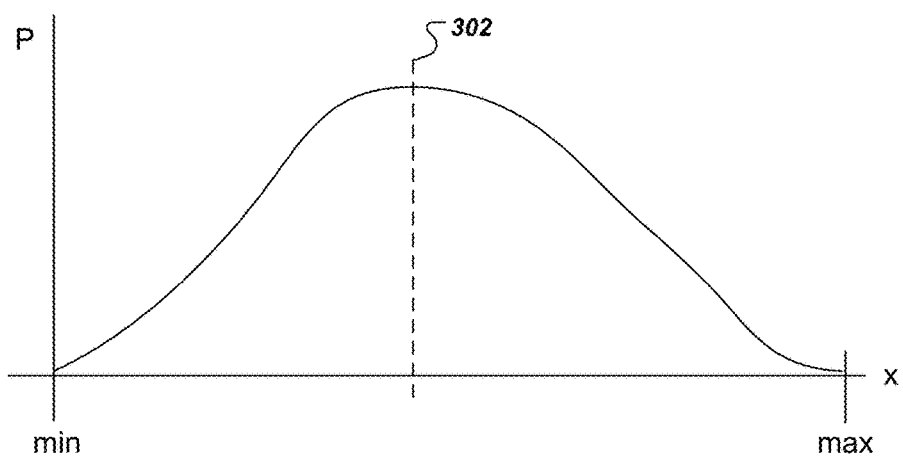
FIGS. 3A-3B illustrate feature value distributions for alerts of two different rule types.
Figure 3B:
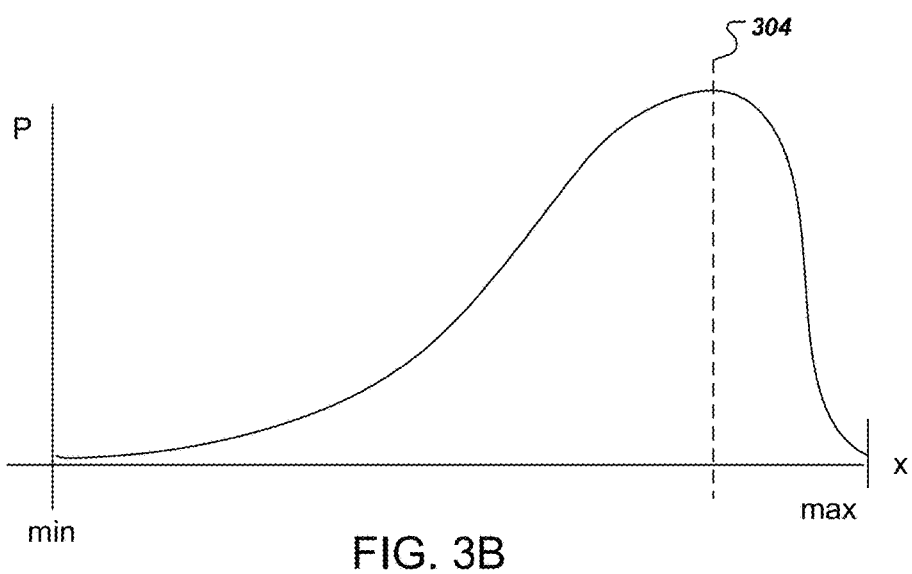

FIGS. 3A-3B illustrate feature value distributions for alerts of two different rule types. The feature value distributions have been computed for two samples of alerts having different attributes that correspond to the different rule types used to generate the different samples of alerts. FIG. 3A illustrates a first feature value distribution for a first sample of alerts for a first feature, Feature 1, and the attribute value for the alert is Rule1. The x-axis represents different feature values x between a minimum feature value and a maximum feature value. The y-axis represents the likelihood of observing each feature value x from the sample of alerts having the same attribute value. Thus, the y-axis represents the likelihood that Feature 1=x when considering one or more alerts having the attribute "Rule1."

The feature value distribution in FIG. 3A indicates that the most likely feature value, corresponding to the dotted line 402, is roughly halfway between the min and the max feature values.

FIG. 3B illustrates another feature value distribution for the same first feature, but for alerts having an attribute corresponding to a different rule type, Rule2. The feature value distribution in FIG. 3B indicates that the most likely feature value, corresponding to the dotted line 404, is much closer to the max feature value than the most likely feature value was for the feature value distribution in FIG. 3A.

These two feature distributions indicate that for Feature 1, alerts generated by executing Rule 2 are more likely to have feature values that are closer to the max feature value than for alerts generated by executing Rule 1.

Figure 3C:
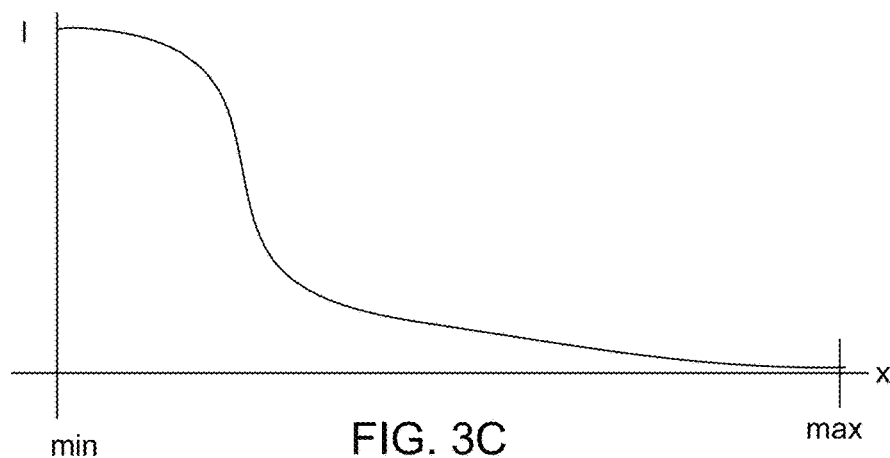
FIG. 3C illustrates an importance distribution for a particular feature.

FIG. 3C illustrates an importance distribution for a particular feature. In this example, the importance distribution is for the same feature, Feature 1, that was used for the feature value distributions in FIGS. 3A-B.

In FIG. 3C, the x-axis represents different feature values x between a minimum feature value and a maximum feature value. The y-axis represents a measure of importance for each feature value x.

The distribution in FIG. 3C represents that feature values that are closer to the minimum value are considered to be more important than feature values that are closer to the maximum value. This is the case, for example, with prevalence, where very commonly occurring alerts are unlikely to be highly important.

The system can compute respective feature scores using each feature value distributions in FIG. 3A and FIG. 3B with the importance distribution in FIG. 3C according to equation (1) above. From this data, it can be see that alerts generated for Rule 1 are likely to be more important than alerts generated for Rule 2. For example, if Feature 1 is prevalence, this can be because there are more occurrences of rare alerts generated for Rule 1 than for Rule 2. And from the importance distribution in FIG. 3C, rare alerts are considered to be more important for this feature. The alerts generated for Rule 2 tend to be very common, and thus, from the importance distribution, their respective feature scores will be less significant than the feature scores for alerts generated by Rule 1.

The system can obtain the importance distributions in a number of ways. Typically, they are predetermined, e.g., independent of and usually before any alerts have been analyzed. These predetermined importance distributions can be specified manually by experts or computed from empirical data. For some features, the importance distribution can actually represent a scalar value by having a maximum likelihood at the value and zero everywhere else. This can, for example, encode expert knowledge that some alerts are important whenever they occur.

The system computes a respective weight for each alert using respective feature scores computed for the alert (250). The system can combine the feature scores into a weight for the alert. In some implementations, the system computes the weight according to:

$$W_i = c_1 f_1(A_i) + c_2 f_2(A_i) + c_3 f_3(A_i) \ldots ,$$

where each $f_n(A_i)$ term represents a different feature score and each $c_n$ is a coefficient that represents a measure of the relative trust in each feature. The coefficients can be predetermined constants that are specified by an expert or that are computed from empirical data.

The steps 210, 220, 240, and 250 can all be computed offline, e.g., before any request to compute weights for alerts is received. Some features may require more frequent updating than others. For example, the reachability of an alert according to a call graph of the project is very unlikely to change much over short periods of time. On the other hand, a feature like file hotness is more likely to have significant changes over small recent time periods. Therefore, the system can recompute feature values for file hotness more often than feature values for reachability. In addition, the system can regularly recompute the feature scores as more snapshots and more projects become available for analysis.

The system generates a user interface presentation corresponding to the request (260). In general, the system generates a user interface presentation that helps a user prioritize alerts. This can be used to determine which alerts or portions of a code base need improving and therefore, which alerts or portions to spend resources on.

As one example, the user interface presentation can display a single list of the alerts having the highest weights. For example, the request can be a request for all alerts in a project, and the system can display a list of all alerts ranked by their weight. The user can view additional alerts by select a user interface element to show the next N alerts.

As another example, the user interface presentation can aggregate the alerts by one or more alert attributes and then display each of the attributes. A user selection of an attribute will reveal alerts having that attribute, which alerts can be ranked by their respective weights. The initial presentation of attributes can rank the attributes in a particular way. For example, if the attribute is a rule, the system can use the expert-assigned score to rank each of the rules in the initial presentation. The system can then present the ranked list of the rules themselves. A user selection of a given rule can reveal one or more alerts generated for that rule. The revealed alerts can also be ranked according to their computed weights, which, as described above, can be influenced by many other factors other than which rule generated the alert. As another example, the attribute can be the file that the alert occurs in. In that case, the system can present the files themselves, and a user selection of a given file can reveal one or more alerts occurring in the file, possibly ranked by their respective weights.

The system can also tailor the presentation based on the user who is logged in. This provides a user-centric view of alerts. In this case, the system can adjust the weights for the alerts based on the user who logged in. For example, the system can give more weight to alerts that the user herself or himself introduced. As another example, the system can give more weight to alerts occurring in files that the user is involved in, e.g., files that the user has recently viewed or worked on according to the commit history.

As another example, the system can give more weight to alerts for rules of a type that the user has a tendency to fix. That is, the system can use the user's alert fix history to determine the types of alerts that the user prefers to fix. Then, the system can give more weight to these types of alerts.

The system can also generate a user interface presentation that hides the details of the weights and which simply suggests some alerts as being interesting to the user. This can encourage multiple developers to focus their time to collaborate on fixing the same alerts.

Figure 4:
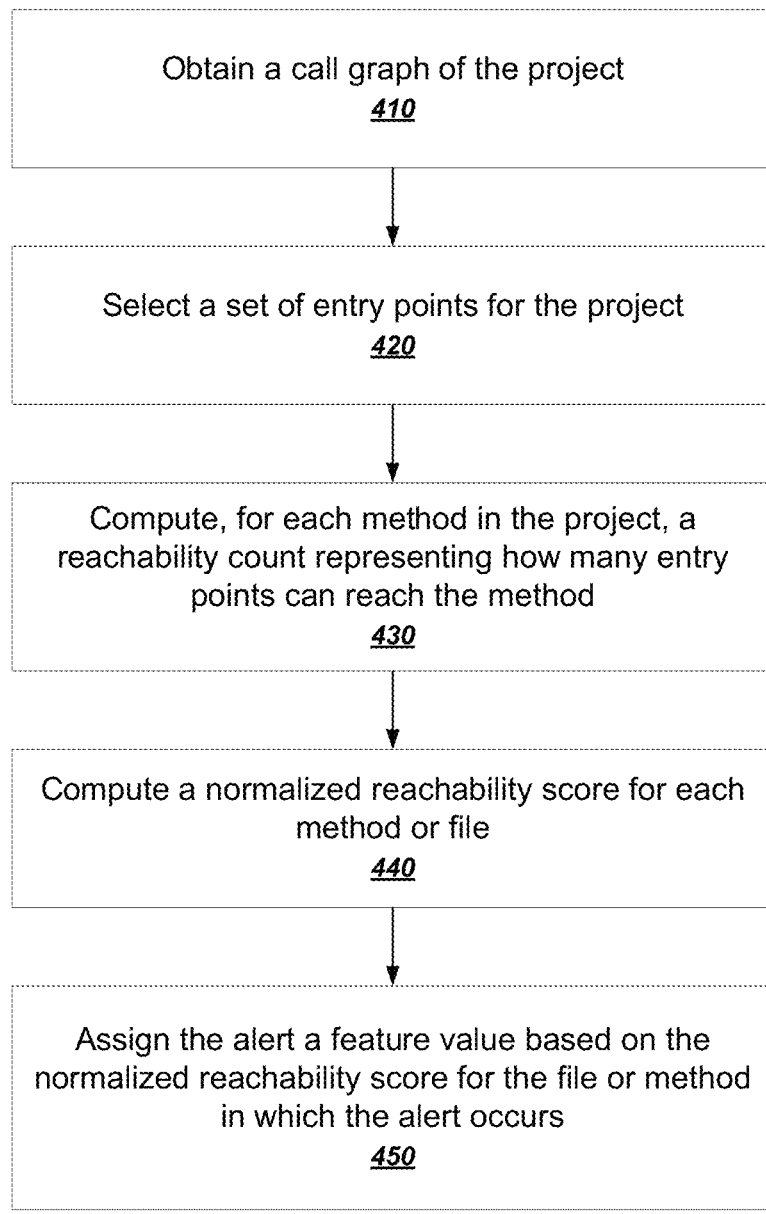
FIG. 4 is a flow chart of an example process for computing reachability for alerts occurring in a particular project.

FIG. 4 is a flow chart of an example process for computing reachability for alerts occurring in a particular project. Reachability is an example of an alert-level feature. The system obtains a call graph of the project (410). As described above, the system can compute the call graph from scratch when a request to analyze a particular project is received. Alternatively, in some cases the system can reuse a call graph computed for a recent commit of the project.

The system selects a set of entry points for the project (420). Each entry point is a point in the source code of a project at which control can be passed from code of an operating system to code of the project. For example, entry points include public methods and main methods defined in the source code of a project.

The system computes, for each method in the project, a reachability count representing how many entry points can reach the method (430). The rationale is that if an alert occurs in a method that is reachable by many entry points, the alert is more likely to be important.

To compute the reachability count, the system can use the call graph to determine if a method is reachable from each entry point. In some implementations, the system computes the transitive closure of the call graph and then determines how many times each method is related to an entry point in the transitive closure.

The system can optionally take per-method reachability count and aggregate to the file level to simplify the computation. To do so, the system can compute a representative reachability count for each file. In some implementations, the system computes an arithmetic average of reachability counts for each method in the file. Thus, files having many methods with high reachability counts will have higher reachability averages than files having fewer methods with high reachability counts.

The system computes a normalized reachability score for each file or method (440). The normalized reachability score represents the relative reachability of each file or method compared to all other files or methods in the project. To do so, the system can first rank each file or method by its reachability count and then divide the rank by the total number of files or methods in the project.

The system assigns the alert a feature value based on the normalized reachability score for the file or method in which the alert occurs (450). As part of this process, files or methods that are the most reachable will have the lowest feature values.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g, a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A method performed by a source code analysis system comprising one or more computers, the method for analyzing source code of one or more software projects stored in one or more version control systems, the method comprising:

in response to receiving a request from a device of a user of the source code of the one or more software projects for alerts associated with coding defects in the source code, after the user logged in the source code analysis system, identifying the user who logged in the source code analysis system;

obtaining the source code of the one or more software projects from respective version control systems;

analyzing the source code of the one or more software projects to identify a plurality of coding defects;

generating an alert for each of the plurality of coding defects, wherein each alert of the plurality of alerts represents a respective coding defect and has one or more respective attribute values for one or more features of the plurality of features;

obtaining, for each feature of the plurality of features, an importance distribution, represented by P (Importance|A) mapping one or more feature values for the feature, represented by A, to a respective measure of importance for each alert in the plurality of alerts having the one or more feature values, wherein the importance distribution is obtained based on integration over (1) mapping between feature values and likelihoods of importance, represented by P(I|x) and (2) feature value distribution, represented by P(x|A), wherein the importance distribution is represented by P(Importance|A)=∫P(I|x)*P(x|A)dx;

computing, for each alert and for each feature, a respective feature value likelihood to which a corresponding feature value for each alert is mapped on the importance distribution;

computing, for each feature of one or more respective features of the one or more alerts, a respective feature score, the respective feature score being a value to which the computed feature value likelihood for the respective feature is mapped on the importance distribution for the respective feature;

computing, for each alert of the plurality of alerts, a respective weight for the alert by combining the respective feature score for each feature computed for the alert;

adjusting at least one respective weight based on a file that the user is involved in;

ranking the plurality of alerts according to the respective weights comprising at least one adjusted weight to indicate a priority of addressing respective coding defects represented by the alerts and by at least generating a user interface presentation that presents one or more of the alerts in an order according to the respective weights comprising at least one adjusted weight for the alerts; and causing a user-centric interface presentation to be generated at the device of the user based on the ranked plurality of alerts, the user interface presentation presenting one or more top-ranked alerts and corresponding portions of source code associated therewith that need improving for guiding the user on how to improve quality of the source code of the one or more software projects in the respective version control systems.

2. The method of claim 1, wherein each alert has a respective attribute value that represents a rule type of a static analysis rule used to generate the alert.

3. The method of claim 1, wherein each alert has a respective attribute value that represents a file in which the alert occurs.

4. The method of claim 3, wherein computing the respective feature values for alerts comprises computing a feature value using alerts having a particular attribute and occurring during a same time window.

5. The method of claim 1, wherein responding to the request comprises providing a user interface presentation that presents a plurality of attribute values for a particular alert attribute, and further comprising:

receiving a user selection of the particular attribute value; and in response to receiving the user selection, displaying on the user device one or more alerts having the particular attribute value.

6. The method of claim 1, further comprising: identifying a user who submitted the request;

identifying one or more alerts of the plurality of alerts that represent respective coding defects introduced in one or more software projects of the plurality of software projects by the user who submitted the request; and wherein responding to the request comprises providing a user interface presentation that prioritizes the one or more alerts that represent the respective coding defects introduced by the user.

7. The method of claim 1, further comprising:
identifying a user who submitted the request;
identifying one or more files of the software project that the user has viewed or worked on; and
wherein responding to the request comprises providing a user interface presentation that prioritizes alerts that occur in the one or more files.

8. The method of claim 1, further comprising: computing, from the respective feature values computed for a feature, a feature value distribution that represents a likelihood that an alert having an attribute value will have a particular feature value for the feature.

9. A system comprising: one or more computers and one or more storage devices storing instructions that are operable, when executed by the one or more computers, to cause the one or more computers to perform at least:

in response to receiving a request from a device of a user of source code of one or more software projects stored in one or more version control systems for alerts associated with coding defects in the source code, after the user lowed in a source code analysis system,
identify the user who lowed in the source code analysis system;

obtain the source code of the one or more software projects from respective version control systems;

analyze the source code of the one or more software projects to identify a plurality of coding defects;

generate an alert for each of the plurality of coding defects, wherein each alert of the plurality of alerts represents a respective coding defect and has one or more respective attribute values for one or more features of the plurality of features;

obtain, for each feature of the plurality of features, an importance distribution, represented by P (Importance|A), mapping one or more feature values for the feature, represented by A, to a respective measure of importance for each alert in the plurality of alerts having the one or more feature values, wherein the importance distribution is obtained based on integration over (1) mapping between feature values and likelihoods of importance, represented by P(I|x), and (2) feature value distribution, represented by P(x|A), wherein the importance distribution is represented by P(Importance|A)=∫P(I|x)*P(x|A)dx;

compute, for each alert and for each feature, a respective feature value likelihood to which a corresponding feature value for each alert is mapped on the importance distribution;

compute, for each feature of one or more respective features of the one or more alerts, a respective feature score, the respective feature score being a value to which the computed feature value likelihood for the respective feature is mapped on the importance distribution for the respective feature;

compute, for each alert of the plurality of alerts, a respective weight for the alert by combining the respective feature score for each feature computed for the alert;

adjust at least one respective weight based on a file that the user is involved in;

rank the plurality of alerts according to the respective weights comprising at least one adjusted weight to indicate a priority of addressing respective coding defects represented by the alerts and by at least generating a user interface presentation that presents one or more of the alerts in an order according to the respective weights comprising at least one adjusted weight for the alerts; and cause a user-centric interface presentation to be generated at the device of the user based on the ranked plurality of alerts, the user interface presentation presenting one or more top-ranked alerts and corresponding portions of source code associated therewith that need improving for guiding the user on how to improve quality of the source code of the one or more software projects in the respective version control systems.

10. The system of claim 9, wherein each alert has a respective attribute value that represents a rule type of a static analysis rule used to generate the alert.

11. The system of claim 9, wherein each alert has a respective attribute value that represents a file in which the alert occurs.

12. The system of claim 11, wherein computing the respective feature values for alerts comprises computing a feature value using alerts having a particular attribute and occurring during a same time window.

13. The system of claim 9, wherein responding to the request comprises providing a user interface presentation that presents a plurality of attribute values for a particular alert attribute, and further comprising:

receiving a user selection of the particular attribute value; and in response to receiving the user selection, displaying on the user device one or more alerts having the particular attribute value.

14. The system of claim 9, further comprising: identifying a user who submitted the request; identifying one or more alerts of the plurality of alerts that represent respective coding defects introduced in one or more software projects of the plurality of software projects by the user who submitted the request; and wherein responding to the request comprises providing a user interface presentation that prioritizes the one or more alerts that represent the respective coding defects introduced by the user.

15. The system of claim 9, further comprising:
identifying a user who submitted the request;
identifying one or more files of the software project that the user has viewed or worked on; and
wherein responding to the request comprises providing a user interface presentation that prioritizes alerts that occur in the one or more files.

16. The system of claim 9, further comprising: computing, from the respective feature values computed for a feature, a feature value distribution that represents a likelihood that an alert having an attribute value will have a particular feature value for the feature.

17. A computer program product comprising one or more hardware storage devices, storing encoded computer-executable instructions which are executable by one or more computers to cause the one or more computers to perform:

in response to receiving a request from a device of a user of source code of one or more software projects stored in one or more version control system for alerts associated with coding defects in the source code, after the user lowed in a source code analysis system, identify the user who lowed in the source code analysis system;

obtain the source code of the one or more software projects from respective version control systems;

analyze the source code of the one or more software projects to identify a plurality of coding defects;

generate an alert for each of the plurality of coding defects, wherein each alert of the plurality of alerts represents a respective coding defect and has one or more respective attribute values for one or more features of the plurality of features;

obtain, for each feature of the plurality of features, an importance distribution, represented by P (ImportanceIA), mapping one or more feature values for the feature, represented by A, to a respective measure of importance for each alert in the plurality of alerts having the one or more feature values, wherein the importance distribution is obtained based on integration over (1) mapping between feature values and likelihoods of importance, represented by P(IIx), and (2) feature value distribution represented by P(xIA), wherein the importance distribution is represented by P(ImportanceIA)=fP(IIx)*P(xIA)dx;

compute, for each alert and for each feature, a respective feature value likelihood to which a corresponding feature value for each alert is mapped on the importance distribution;

compute, for each feature of one or more respective features of the one or more alerts, a respective feature score, the respective feature score being a value to which the computed feature value likelihood for the respective feature is mapped on the importance distribution for the respective feature;

compute, for each alert of the plurality of alerts, a respective weight for the alert by combining the respective feature score for each feature computed for the alert;

adjust at least one respective weight based on a file that the user is involved in;

rank the plurality of alerts according to the respective weights comprising at least one adjusted weight to indicate a priority of addressing respective coding defects represented by the alerts and by at least generating a user interface presentation that presents one or more of the alerts in an order according to the respective weights comprising at least one adjusted weight for the alerts; and cause a user-centric interface presentation to be generated at the device of the user based on the ranked plurality of alerts, the user interface presentation presenting one or more top-ranked alerts and corresponding portions of source code associated therewith that need improving for guiding the user on how to improve quality of the source code of the one or more software projects in the respective version control systems.

18. The computer program product of claim 17, wherein each alert has a respective attribute value that represents a rule type of a static analysis rule used to generate the alert.

19. The computer program product of claim 17, wherein each alert has a respective attribute value that represents a file in which the alert occurs.

20. The computer program product of claim 17, wherein computing the respective feature values for alerts comprises computing a feature value using alerts having a particular attribute and occurring during a same time window.

* * * * *